United States Patent [19]

Gowanlock

[11] 4,332,513
[45] Jun. 1, 1982

[54] FACE GROOVING TOOL

[75] Inventor: Thomas W. Gowanlock, Rochester, Mich.

[73] Assignee: General Electric Company, Columbus, Ohio

[21] Appl. No.: 171,944

[22] Filed: Jul. 24, 1980

[51] Int. Cl.³ .............................................. B26D 3/06
[52] U.S. Cl. .................................. 407/101; 407/107; 407/120; 408/703; 82/36 R
[58] Field of Search .............. 407/101, 107, 109, 111, 407/112, 117, 120, 65, 64, 66; 82/1, 36, 37, 11, 18; 408/204, 205, 206, 207, 67, 68, 703, 239 R, 241

[56] References Cited

U.S. PATENT DOCUMENTS

| | | | |
|---|---|---|---|
| 2,869,405 | 1/1959 | Wolfe | 408/703 |
| 3,387,637 | 6/1968 | Ferguson et al. | 408/204 |
| 3,546,980 | 12/1970 | Lemanski | 408/206 |
| 3,610,768 | 10/1971 | Cochran | 408/204 |
| 4,118,138 | 10/1978 | Takacs et al. | 407/112 |

Primary Examiner—Leonidas Vlachos
Attorney, Agent, or Firm—Hedman, Casella, Gibson & Costigan

[57] ABSTRACT

A face grooving tool is disclosed for machining circular grooves in a metal workpiece. More particularly, a face grooving tool includes an elongated shank having an arcuate support blade projecting axially outwardly from one end thereof. The leading surface of the support blade includes an offset V-groove configuration, with the vertex thereof being located nearer to the radially inner surface of the support blade than the radially outer surface. By this arrangement, the radially outermost portion of a cutting insert, which is receivable in the offset groove, is provided with added support during a cutting operation. The arcuate configuration of the support blade enables the blade to be received in the circular groove being machined in the workpiece thereby providing continuous support for the insert.

10 Claims, 4 Drawing Figures

FACE GROOVING TOOL

This invention relates to a face grooving tool. More particularly, it relates to a face grooving tool having a new and improved support blade configuration providing improved balance and stability to reduce the likelihood of blade failure.

BACKGROUND OF THE INVENTION

In the prior art, various tools have been developed for machining circular grooves in a metal workpiece. The prior art face grooving tools include an elongated shank for holding a replaceable cutting insert which projects outwardly from one end of the shank. The prior art tools often include a support blade, which projects outwardly from the shank and acts as a brace for the cutting insert. The earlier prior art support blades were generally rectangular in configuration, having a V-shaped support groove adapted to receive a cutting insert having a V-shaped trailing surface opposed to a planar leading cutting surface. The cutting edge of the insert projects axially outwardly beyond the support blade such that during a machining operation, wherein the workpiece is rotated relative to the tool, a circular groove could be machined having a depth corresponding to the amount which the insert projects beyond the support blade. Due to the extreme cutting forces bearing on the insert during a machining operation, the amount which the insert can project beyond the blade is limited, since the likelihood of insert fracture increases when a large portion of the insert is left unsupported. Thus the prior art rectangular support blades, which are required to prevent insert fracture, limited the depth of the groove which could be machined.

In order to obviate this shortcoming, support blades were developed having a tapered, arcuate configuration, having a maximum width less than the width of the insert, and a curvature corresponding to the curvature of the groove to be machined. Due to this modified configuration, during a machining operation, the support blade follows the insert and is received in the groove machined thereby.

While the prior art arcuate tapered blades permitted the depth of the grooves to be increased for certain applications the blades failed to provide as much support for the insert as the rectangular blades. More particularly, in a circular cutting operation, the highest forces bearing on the insert occur adjacent its radially outermost cutting edge. The tapered curved support blades provided insufficient mass behind the insert to enable machining under heavy load conditions. Therefore, it would be desirable to provide a face grooving tool with an improved support blade configuration which is adapted to receive a cutting insert and provide sufficient support thereto, particularly adjacent the radially outermost cutting edge thereof, thereby preventing blade failure.

Accordingly, it is an object of the subject invention to provide a new and improved face grooving tool for machining circular grooves in a workpiece including a support blade having a configuration which provides increased support for the insert.

It is another object of the subject invention to provide a new and improved face grooving tool having an arcuate support blade enabling the machining of grooves of increased depths.

It is a further object of the subject invention to provide a face grooving tool having a support blade with the leading surface thereof including an offset, V-groove configuration, which provides increased support for the radially outermost portion of the cutting insert thereby reducing the likelihood of blade failure.

It is still another object of the subject invention to provide a face grooving tool having an arcuate support blade of constant width to provide increased support to the insert.

It is still a further object of the subject invention to provide a face grooving tool having a unique clamping means which includes a bearing arm with a relieved configuration enabling the reach out over the insert to be increased thereby increasing the stability of the tool.

SUMMARY OF THE INVENTION

In accordance with these and many other objects, the subject invention includes a face grooving tool comprising an elongated shank having an arcuate support blade projecting axially outwardly from one end thereof. The support blade which has a configuration corresponding to a segment of a cylinder is provided with a radius of curvature substantially corresponding to the radius of curvature of the circular groove to be machined. The upper leading surface of the support blade has an offset V-shaped groove configuration which includes radially inner and outer planar sides coinciding in a vertex. The radially outer planar side of the V-shaped groove is longer than the radially inner side, and the vertex of the groove is disposed closer to the radially inner arcuate surface of the support blade than the radially outer arcuate surface.

An elongated cutting insert is provided having a planar leading cutting surface and an opposed V-shaped, trailing surface, which substantially corresponds to the configuration of the offset V-shaped groove of the support blade, and is receivable therein. A clamping means connected to the shank is provided to secure the insert to the tool.

In operation, when the workpiece is rotated relative to the cutting tool, the cutting edge of the insert which projects beyond the blade, machines a circular groove in the workpiece. As the cutting progresses, the arcuate support blade is received within the groove enabling the depth of the cut to be increased. In accordance with the subject invention, the new and improved V-shaped groove configuration of the blade provides maximum support for the radially outermost portion of the insert, which is subjected to the greatest cutting forces. By this arrangement, the likelihood of blade failure is substantially reduced. Preferably, the support blade is provided with a constant width thereby further increasing the stability of the tool as compared with the tapered support blade of the prior art. Alternatively, the support blade may be tapered for those applications where it is required to cut a range of groove diameters. The subject invention further includes a unique relieved or tapered clamping means enabling the latter to be at least partially receivable in the machined groove. By this arrangement, the reach out over the insert may be increased, further stabilizing the tool.

Further objects and advantages of the subject invention will become apparent from the following detailed description when taken in conjunction with the drawings in which.

DESCRIPTION OF THE PREFERRED EMBODIMENT

Figure 1:
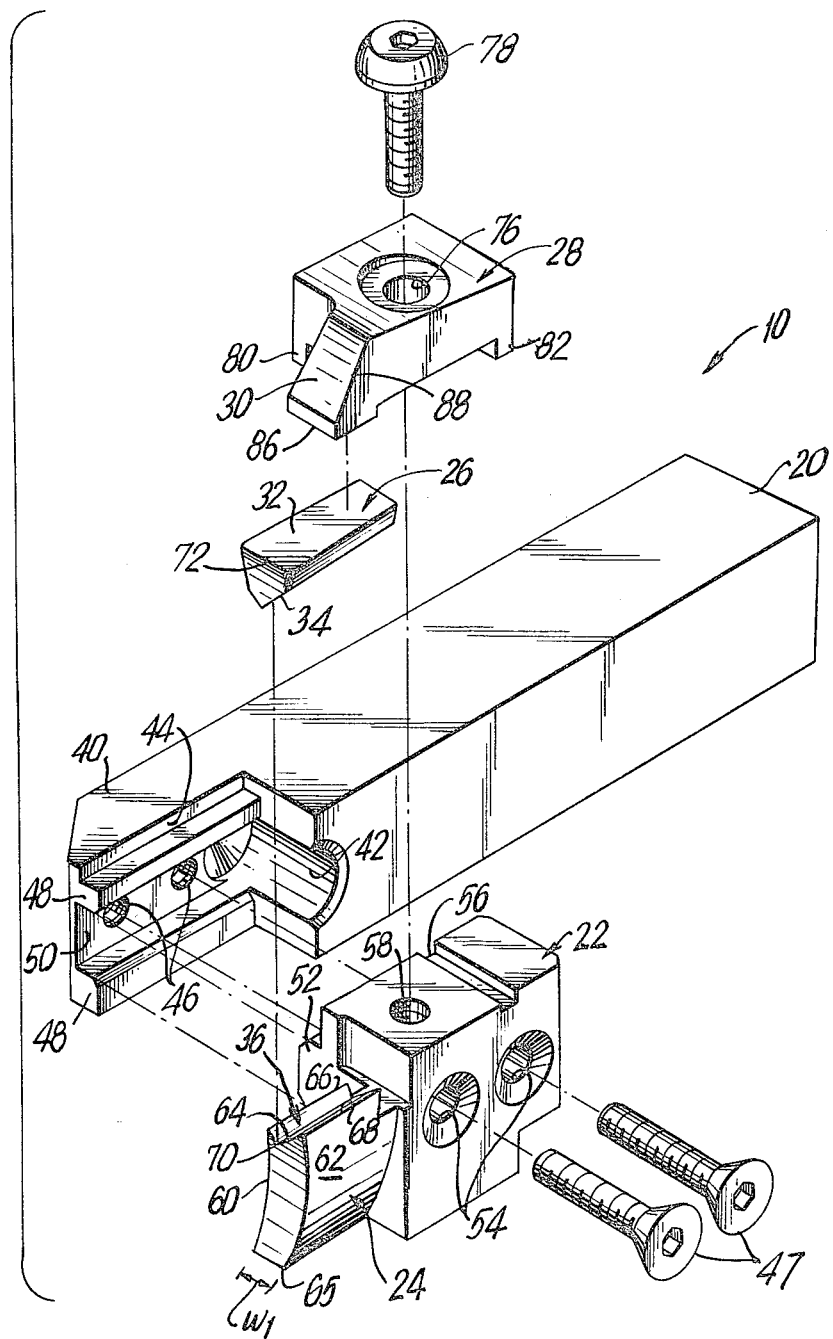
FIG. 1 is an exploded perspective view of the new and improved face grooving tool of the subject invention.

Referring to FIG. 1, the new and improved face grooving tool 10 of the subject invention is illustrated which is capable of machining circular grooves in a metal workpiece. The cutting tool 10 comprises an elongated shaft 20, and a removable insert holder 22 having a unique arcuate support blade 24. Support blade 24 is configured to receive an elongated cutting insert 26. Clamp 28, which is connectable to insert holder 22, has a bearing arm 30 for securing the insert 26 to the insert holder 22.

Insert 26 includes a planar leading cutting surface 32 and an opposed trailing surface 34. As used herein, the terms leading and trailing refer to the direction of rotation of the tool 10 relative to the workpiece, with the leading surfaces preceding the trailing surfaces. In operation, when the cutting tool 10 is rotated in the direction of arrow A relative to the workpiece (see FIG. 4), the radially outermost portions of the insert 26 are subjected to the greatest stress. Therefore, in accordance with the subject invention, the trailing surface 34 of insert 26 is provided with an offset V-configuration which conforms to the configuration of the groove 36 of support blade 24. By this arrangement, the forces developed during a cutting operation are more evenly distributed throughout the support blade 24.

Shank 20, which may be rectangular in configuration, includes a cutting end 40 having a generally L-shaped cutout on one side thereof, defining two orthogonally disposed walls 42 and 44. The L-shaped cutout may be disposed on either the left or right side of shank 20 depending upon whether the tool is to be used for right hand or left hand machining. Wall 44 is provided with means for securely mounting insert holder 22 which include a pair of threaded apertures 46 for receiving screws 47. Wall 44 is further provided with a pair of projecting locating rails 48 which cooperate to define recess 50 which aids in stabilizing the insert holder 22.

Preferably, insert holder 22 is removably mounted on shank 20. By this arrangement, various insert holders 22 having support plates 24 of different curvatures may be interchanged and mounted on a single, standard shank 20. It is to be understood, that the insert holder 22 may be permanently mounted on the shank or formed integral therewith, however, it is preferable that the holder 22 be interchangeable such that only one shank 20 need be provided, thereby reducing the costs of tooling.

The insert holder 22 is provided with a longitudinally extending, locating detent 52 which is receivable in recess 50 between rails 48 of shank 20 when the holder is mounted. The holder 22 is secured to the shank 20 via screws 47. More particularly, holder 22 is provided with apertures 54 which are aligned with apertures 46 in wall 44 of the shank. Screws 47 are threaded through the aligned apertures 46 and 54 and tightened to secure the holder 22 in place. The upper surface of the insert holder 22 includes a slot 56 and a threaded aperture 58, to facilitate the mounting of clamp 28, as more fully described hereinafter.

Figure 4:
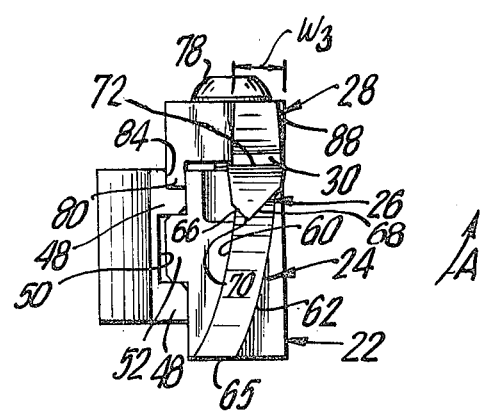
FIG. 4 is a front elevational view of the cutting end of the new and improved face grooving tool of the subject invention.

In accordance with the subject invention, insert holder 22 includes a unique arcuate support blade 24 which projects axially outwardly therefrom. Support blade 24 which is essentially a segment of a cylinder having a curvature corresponding to the curvature of the circular groove to be machined, is defined by two opposed radially inner and outer arcuate surfaces 60 and 62 respectively. Preferably, the arcuate surfaces 60 and 62 are spaced apart a constant distance $W_1$, which is less than the width $W_2$ of insert 26. By this arrangement, the blade 26 is receivable in the groove machined by insert 26, enabling cuts of increased depth. The support blade 24 is further defined by opposed leading and trailing surfaces 64 and 65 with the leading surface 64 having an offset V-shaped support groove configuration. More particularly, support groove 36 includes radially inner and outer planar sides 66 and 68, respectively, which coincide at vertex 70. As illustrated in FIG. 4, vertex 70 is disposed closer to the radially inner surface 60 of support blade 24 than the radially outer surface 62 thereof. Further, the length of the radially outer side 68 is greater than the length of the radially inner side 66. The trailing surface 34 of insert 26 is provided with a configuration substantially corresponding to the configuration of V-shaped groove 36 enabling the insert to be easily received therein. Due to the offset V-groove 36, an increased portion of the mass of the support blade is disposed such that the radially outermost portions of insert 26, which are subjected to the highest stresses, are provided with increased support. This feature, in combination with the constant width ($W_1$) of the blade 24, provides increased stability and support for the insert during high stress cutting operations, thereby reducing the likelihood of blade failure. Alternatively, the blade 24 may be tapered, especially for those applications where a range of groove diameters is to be cut.

Figure 2:
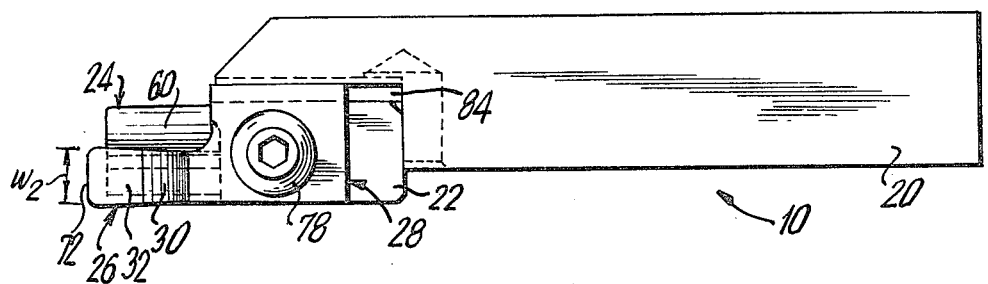
FIG. 2 is a top plan view of the new and improved face grooving tool of the subject invention.
Figure 3:
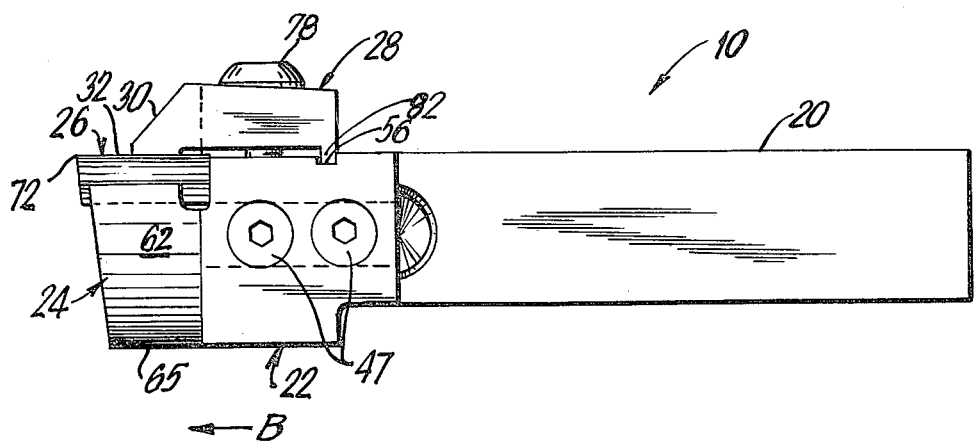
FIG. 3 is a side elevational view of the new and improved face grooving tool of the subject invention.

After a selected insert holder 22 having support blade 24 of the desired curvature is mounted on the shank 20, an insert 26 is placed in groove 36 such that the cutting edge 72 thereof projects axially beyond support blade 24, as illustrated in FIGS. 2 and 3. Clamp 28 is utilized to secure the insert in place in the offset V-shaped groove 36. As illustrated in FIG. 1, clamp 28 is provided with an aperture 76, which is aligned with threaded aperture 58 in the upper surface of holder 22, such that the clamp may be secured thereto via screw 78. Clamp 28 further includes a pair of downwardly extending side and rear detents 80 and 82 respectively, to facilitate the accurate positioning of the clamp. More specifically, rear detent 82 is receivable in slot 56 of holder 22. In addition, side detent 80 is receivable in channel 84, which is a U-shaped area defined by wall 44 and rail 48 of shank 20, as well as the adjacent side of the insert holder 22.

In order to hold the insert 26 in groove 36, clamp 28 is provided with bearing arm 30 which projects outwardly over the insert, with the planar bottom surface 86 thereof abutting the planar leading surface 32 of the insert. The maximum width $W_3$ of bearing arm 30 is less than the width $W_2$ of insert 26. Preferably, and as seen best in FIG. 4, the radially outermost portion of arm 30 is recessed or tapered adjacent its upper end 88. By this arrangement, during a cutting operation, at least a portion of bearing arm 30 is also receivable in the groove machined by insert 26. Thus, since the depth of the cut is not restricted by the bearing arm 30, the extent which the arm reaches out over the insert may be increased. More specifically, if the bearing arm 30 were not recessed, thereby preventing it from entering the machined groove, its reach out over the insert would have to be reduced. In contrast to the clamps utilized in the prior art, by recessing the top portion 88 of arm 30, the reach out over the insert may be increased thereby providing additional stability to the tool 10.

After the insert 26 has been secured in place by clamp 28, the face grooving tool 10 of the subject invention may be utilized to machine circular grooves in a workpiece. Generally, the metal workpiece is rotated at high speeds relative to shaft 20, and is brought into contact with the insert 26, such that cutting edge 72 thereof machines a groove having a width corresponding to the width $W_2$ of the insert 26. As the groove is being machined, the tool 10 is moved in the direction of arrow B, (see FIG. 3) relative to the workpiece, such that the depth of the groove being machined is increased. Since the support blade 24 of the insert holder 22 has a curvature corresponding to the curvature of the groove being machined, as the depth of the cut is increased, the support blade is received in the circular groove. More particularly, since the width $W_1$ of the support blade is less than the width $W_2$ of the insert, adequate clearance is provided adjacent both the radially inner and outer surfaces 60 and 62 of the support blade to permit its movement within the groove. By this arrangement, the depth of the groove which may be machined is not limited by the support blade. Further, since the upper portion 88 of the arm 30 of the clamp 28 is relieved, at least a portion of the arm will be received in the circular groove. Thus, even though the reach out over the insert by arm 30 is extended, thereby providing increased stability, the depth of the groove machined is not limited thereby.

As noted above, the new and improved offset V-shaped groove 36 of the support blade 24 provides stability for the insert during use, and also increases and balances the cross-sectional area of the steel support blade which supports the insert. More particularly, and as illustrated in FIG. 4, the greatest force on the cutting edge of the insert occurs at the radially outermost portions thereof. Accordingly, the longer side 68 of groove 36 provides increased support along the radially outermost portion of the insert thereby balancing the forces throughout the support blade. In addition, since the width $W_1$ of the support blade 24 is substantially constant from the leading to the trailing edge thereof, sufficient mass is provided behind the insert to provide the necessary support to minimize insert fracture.

In summary, the subject invention provides for a new and improved face grooving tool for machining circular grooves in a metal workpiece. More particularly, the face grooving tool includes an elongated shank having an arcuate support blade projecting outwardly from one end thereof. The leading surface of the support blade includes an offset V-groove configuration, with the vertex thereof being located nearer to the radially inner surface of the support blade than the radially outer surface. By this arrangement, the radially outermost portion of the insert is provided with added support during a cutting operation. The arcuate support blade, which is preferably provided with a constant width from its leading to its trailing edge, is received in the circular groove machined by the tool such that the depth of the cut is not limited thereby. In a preferred embodiment of the subject invention, an improved clamping means is provided having a recessed bearing arm which is also receivable in the circular groove being machined by the tool. By this arrangement, the reach out over the insert may be increased thereby increasing the stability of the tool.

Although the subject invention has been described by reference to a preferred embodiment, it is apparent that other modifications could be devised by those skilled in the art that would fall within the scope and spirit of the subject invention as defined by the appended claims.

I claim:

1. A tool for machining circular grooves in a workpiece comprising:

an elongated shank member;

an arcuate support blade projecting axially outwardly from one end of said shank member, said support blade being defined by opposed radially inner and outer arcuate surfaces and opposed leading and trailing surfaces, with the longitudinal axes of said arcuate surfaces being parallel to the longitudinal axis of said shank member, said arcuate support blade having a radius of curvature substantially corresponding to the radius of curvature of the circular groove to be machined, and with the leading surface of said support blade including a V-shaped support groove defined by radially inner and outer planar sides coinciding in a vertex, with the radially outer planar side of said support groove being longer than the radially inner side, and with said vertex being disposed closer to said radially inner surface than to said radially outer surface of said support blade;

an elongated cutting insert having opposed leading and trailing surfaces, with the leading surface thereof being planar and with the trailing surface having a configuration substantially corresponding to the configuration of said V-shaped support groove of said support blade and being adapted to be received therein with one end of said insert projecting axially outwardly beyond said support blade; and clamping means, removably connected to said shank member and having a bearing arm abutting the planar leading surface of said insert for maintaining said insert in said V-shaped support groove whereby in the operation of said tool the workpiece is rotated relative to said tool such that said projecting end of said insert machines a circular groove therein, with said arcuate support blade being adapted to fit within said machined groove thereby giving continuous support to said insert, and with said V-shaped groove functioning to give added support to the radially outermost portion of said insert.

2. A tool as recited in claim 1 wherein the width of said arcuate support blade, between said opposed arcuate surfaces, from said leading surface to said trailing surface, is constant.

3. A tool as recited in claim 1 wherein the width of said bearing arm of said clamping means is less than the width of said insert.

4. A tool as recited in claim 1 wherein the radially outermost portion of said bearing arm is tapered such that at least a portion thereof is receivable in said circular groove during a machining operation enabling the reach out over said insert to be increased.

5. A tool as recited in claim 1 wherein said support blade is formed integrally with an insert holder member, said insert holder member being removably connected to said shank member.

6. A tool as recited in claim 5 wherein said insert holder member is mounted to said shank member via screw means.

7. A tool as recited in claim 5 wherein said shank member includes an L-shaped cut out defining a pair of orthogonally related walls, one of said walls including a pair of spaced apart locating rails.

8. A tool as recited in claim 7 wherein one side of said insert holder member is provided with a longitudinally extending detent adapted to be received in a channel defined between said spaced apart locating rails such that said insert holder member is stabilized when connected to said tool.

9. A tool as recited in claim 5 wherein said clamping means includes a downwardly extending detent and wherein said insert holder member includes a slot disposed on the upper surface thereof with said detent of said clamping means being receivable in said slot to localize said clamping means and stabilize said insert.

10. A tool for machining circular grooves in a workpiece comprising:

an elongated shank member;

an arcuate support blade projecting axially outwardly from one end of said shank member, said support blade being defined by opposed radially inner and outer arcuate surfaces and opposed leading and trailing surfaces, with the longitudinal axes of said arcuate surfaces being parallel to the longitudinal axis of said shank member, said arcuate support blade having a radius of curvature substantially corresponding to the radius of curvature of the circular groove to be machined, with the width of said support blade, between said opposed arcuate surfaces, from said leading edge to said trailing edge, being constant, and with the leading surface of said support blade including a V-shaped support groove defined by radially inner and outer planar sides coinciding in a vertex, with the radially outer planar side of said support groove being longer than the radially inner side, and with said vertex being disposed closer to said radially inner surface than to said radially outer surface of said support blade;

an elongated cutting insert having opposed leading and trailing surfaces, with the leading surface thereof being planar and with the trailing surface having a configuration substantially corresponding to the configuration of said V-shaped support groove of said support blade and being adapted to be received therein with one end of said insert projecting axially outwardly beyond said support blade; and clamping means, removably connected to said shank member and having a bearing arm abutting the planar leading surface of said insert for maintaining said insert in said V-shaped support groove, with the width of said bearing arm being less than the width of said insert, and with the radially outermost portion of said bearing arm being tapered, whereby in the operation of said tool the workpiece is rotated relative to said tool such that said projecting end of said insert machines circular groove therein, with said arcuate support blade and at least a portion of said bearing arm being adapted to fit within said machined groove thereby giving continuous support to said insert and with said V-shaped groove functioning to give added support to the radially outermost portion of said insert.

* * * * *